United States Patent [19]

Bildjukevich et al.

[11] 4,421,594

[45] Dec. 20, 1983

[54] METHOD OF AND APPARATUS FOR PRODUCING GRANULATED PRODUCTS FROM A SUSPENSION

[76] Inventors: Viktor L. Bildjukevich, ulitsa Surganova, 8, kv. 37; Leonid N. Turovsky, ulitsa Brestskaya, 86, kv. 36; Vyacheslav J. Meleshko, proezd Golodeda, 9, kv. 6; Dmitry T. Yakimovich, ulitsa Knorina, 10b, kv. 33; Valentina A. Lebedkova, ulitsa Odoevskogo, 36/7, kv. 92; Boris K. Demidovich, 2 pereulok R. Ljuxemburg, 3-a, kv. 120; Gennady Z. Plavnik, ulitsa Ya. Kolasa, 74, kv. 2; Nikolai N. Dubrovsky, ulitsa R. Ljuxemburg, 193, kv. 55; Evgeny A. Proskalovich, ulitsa R. Ljuxemburg, 178, kv. 12; Alexandr I. Pivovarov, ulitsa gaya, 38, korpus 2, kv. 5, all of Minsk, U.S.S.R.

[21] Appl. No.: 291,489

[22] Filed: Aug. 10, 1981

[51] Int. Cl.³ ............................ B01D 1/14; B01D 1/18
[52] U.S. Cl. ................................. 159/4 R; 159/4 A; 159/4 B; 159/16 R; 159/48.1; 159/4 CC
[58] Field of Search ............... 159/4 A, 4 CC, 4 E, 159/4 R, 16 R, 169, 48 R, 4 B

[56] References Cited

U.S. PATENT DOCUMENTS

| | | | |
|---|---|---|---|
| 1,471,765 | 10/1923 | Wilson | 159/4 A |
| 1,513,622 | 10/1924 | Manning | 159/4 E |
| 1,613,334 | 1/1927 | Symmes | 159/4 E |
| 3,423,173 | 1/1969 | McFarlin et al. | 159/4 A |
| 3,618,655 | 11/1971 | Lockwood | 159/4 A |

FOREIGN PATENT DOCUMENTS

| | | |
|---|---|---|
| 2201111 | 1/1972 | Fed. Rep. of Germany . |
| 2080016 | 2/1970 | France . |
| 2083223 | 3/1971 | France . |
| 2266129 | 3/1975 | France . |
| 393547 | 1/1974 | U.S.S.R. . |
| 402726 | 3/1974 | U.S.S.R. . |

*Primary Examiner*—Wilbur L. Bascomb, Jr.
*Attorney, Agent, or Firm*—Fleit, Jacobson & Cohn

[57] ABSTRACT

Disclosed is a method of producing granulated products from a suspension, which comprises in general the steps of spraying the suspension in a suspension spraying zone, introducing a heat-carrier in the form of a spiral flow to a zone disposed beneath the sprying zone, drying the suspension by the heat-carrier concurrently and countercurrently therewith and separating simultaneously fine fractions of the dried material by means of the same flow of the heat-carrier, withdrawing a spent portion of the same, treating thermally the granules produced by drying countercurrently with the aforesaid heat-carrier upon their moving downward in a spiral to a temperature sufficient to ensure the desired product properties, withdrawing processed granules from the thermal treatment zone. Also disclosed is an apparatus implementing the foregoing method, which in general incorporates a chamber whose cross-sectional area is variable in height, suspension spraying means mounted in the upper portion of the chamber having the largest dimensions, heat-carrier introducing means mounted in the lower portion of the chamber and arranged in spirals, whose pitch and diameter is designed variable along the height of the chamber and increase toward the mounting site of the suspension spraying means, pipes provided in the body of the chamber for removing spent gas, and means for discharging a thermally treated product from the lower portion of the chamber.

8 Claims, 12 Drawing Figures

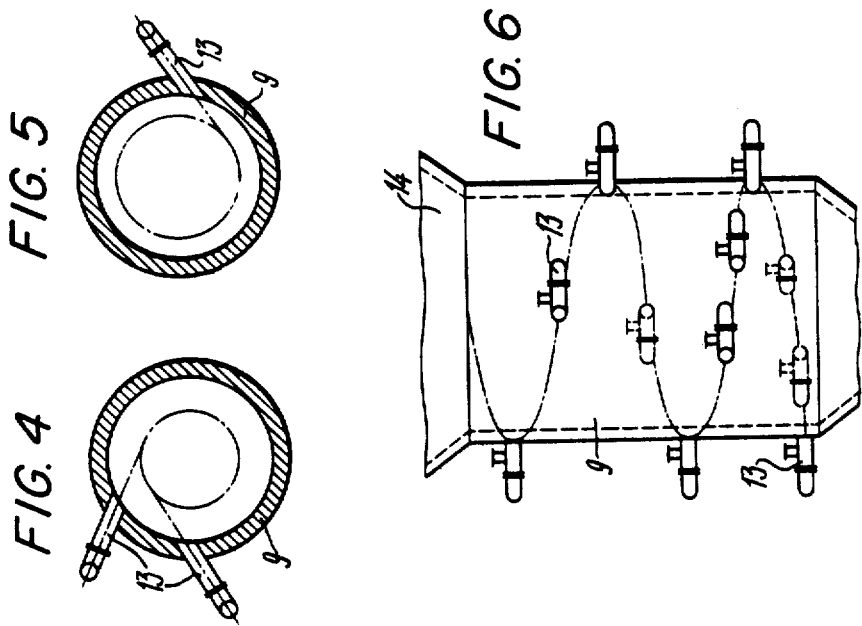
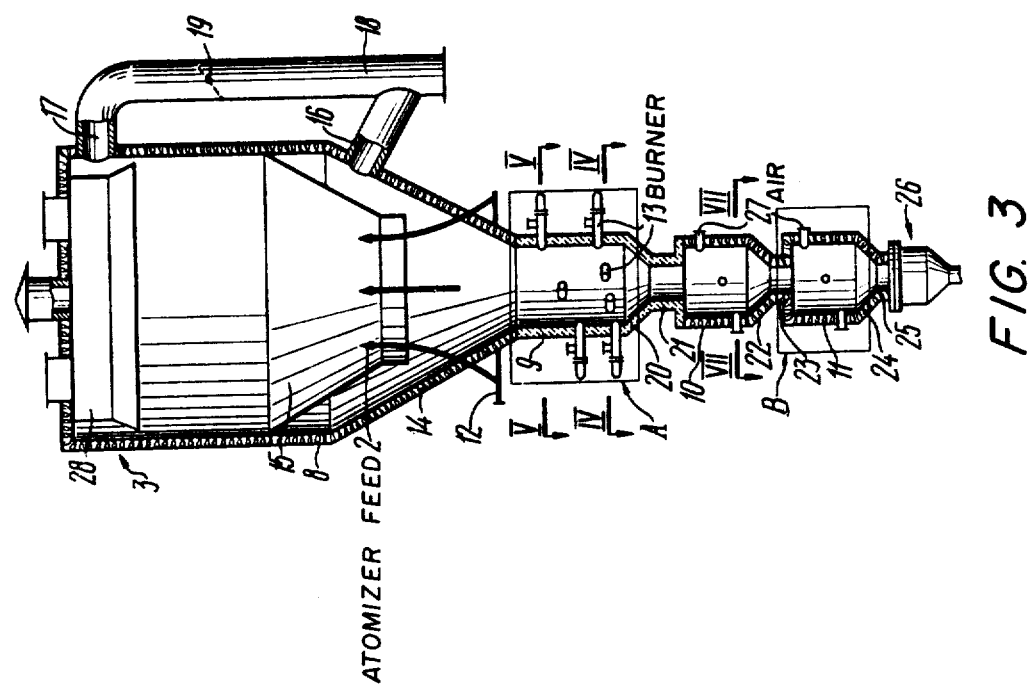

METHOD OF AND APPARATUS FOR PRODUCING GRANULATED PRODUCTS FROM A SUSPENSION

FIELD OF THE INVENTION

The present invention is concerned generally with the technology of processing materials into a granulated product, and more specifically relates to a method of and apparatus for producing granulated products from a suspension.

The present invention can be exploited to the utmost advantage in the thermal treatment of mineral suspensions, such as chalk and cement-raw slurries, ore concentrates in the fabrication of construction materials, chemical, metallurgical and other industries. The invention is also efficiently applicable to the processing of waste materials concomitant a variety of manufacturing sectors, for example, for preparing lime derived from the waste of sugar production, chemical water purification and pulp making. The invention may find utilization for the production of quality products from substandard raw materials.

BACKGROUND OF THE INVENTION

Due to an ever dwindling supply of standard dry raw materials the problem of processing materials available in a naturally moist condition (with a moisture content of 25 to 28%) has nowadays gained tremendous significance. Quite frequently such materials are found to be contaminated with extraneous inclusions, which makes their processing with the conventional techniques next to impossible, not to mention obtaining therefrom a quality product. For instance, loose wet chalk usable in the production of lime and cement as well as clays employed in the manufacture of bricks and ceramic tiles are known to contain appreciable amounts of solid inclusions whose particles may broadly vary in size. The removal of extraneous impurities from such materials can be performed only by way of converting them to the form of suspensions exhibiting an adequate level of fluidity. Commonly such suspensions show a moisture content of 37.0 to 42.0%.

It might be well to point out that the problem of suspension processing is currently of considerable practical interest also in connection with the exigence of processing waste materials of diverse manufacturing sectors which may contaminate the environment. The processing of such waste affording to obtain products used in a number of production processes makes the technology practically waste-free, which enables to achieve a reduction in manufacturing costs. Thus, for example, there may be processed sugar production filtration sediments for the purpose of producing therefrom lime and carbon dioxide, kraft-pulp making and chemical water purification waste for producing lime and mineral fertilizers, metallurgical process waste, etc.

In the overwhelming majority of cases for processing suspensions use is now made of spray-drying methods allowing to significantly intensify drying processes through the provision of a developed surface of the material being dried and thermal treatment conducted in a suspended state. However, such drying results in the material having a heterogeneous granulometric composition and a large amount of fine fractions. At the same time it is frequently required that the treated material possess a granule size in the range of 250 to 800 microns and possibly be monofractional. Thus, for example, in cement production, in which dried granules are subjected to high-temperature heating and decarbonization, it is required that the granules have a size of 400 to 800 microns. In the production of mineral fertilizers it is also required that the material do not include pulverized fractions (with a size of less than 20 microns) and the granules have a size of 200 to 400 microns.

As is known, material granulation is achievable only through the use of special treatment methods and special devices. At the same time it would be expedient to discard the use of any specialized granulating devices whatsoever and to accomplish granulation in the process of drying so as to obtain a granulated product at the same stage of the production process coinciding with that of drying.

It should be noted that apart from drying of the material some production processes call for its high-temperature treatment, which may exert a marked impact on the effectuation of the subsequent procedure of processing a thermally treated product.

Thus, for example, preliminary decarbonization of cement-raw granules enables to raize the output of a cement clinker producing unit 2.5 to 3 times. The granulated materials can be also processed more qualitatively than polydisperse ones because the uniformity of granule sizes allows to provide for them more favorable thermodynamic treatment conditions.

It is known that drying of the material is effected by supplying a heat-carrier to the drying zone. The high-temperature treatment also calls for heating heat-carrier granules. Hence, it would be more economic and expedient to carry out both the procedure of thermal treatment and that of drying using one and the same heat-carrier.

It should be also emphasized that in some cases the treatment of a suspension requires that appropriate provision be made to accomplish drying with a capacity differing from the rated one in 5 to 10 times, while maintaining a constant specific fuel consumption rate. Thus, such requirements are imposed on the processing of sugar production waste when changing the type of raw material, for example, when using as raw materials sugar beet and raw sugar cane.

Accordingly, it has become necessary to evolve a method of and apparatus for producing granulated products from suspensions, which would permit to accomplish drying of the suspension with the production of a granulated product as well as its high temperature thermal treatment to give this product the desired qualities.

Known in the prior art is a method of producing a granulated product from suspensions (see U.S.S.R. Inventor's Certificate No. 393547, Int. Cl. F 26 B3/12, filed Aug. 10, 1973/, which comprises spraying the suspension by a flow of a heat-carrier, drying the same thereby, separating a pulverulent fraction from the dried material in an individual unit, heating this pulverulent fraction by an additional flow of a heat-carrier and supplying it in concentric parallel flows to the suspension spraying zone.

An apparatus for practicing the above-described method comprises a drying chamber having a plurality of concentric guides for a pulverulent fraction, mounted thereinside, a cyclone-powder separator, a powder heating device, a device for mixing powder with an additional heat-carrier flow, means for pneumatically conveying powder to the drying chamber.

The foregoing method of and apparatus for producing a granulated product is characterized by that the pulverulent fractions separated from the dried material are only those which have a size of less than 0.005 mm, while the dried material is not subjected to sizing. Hence, the dried material has a polydisperse composition. Furthermore, the method and apparatus described hereinabove do not enable to effect high-temperature thermal treatment of the granulated product, which essentially confines their range of application. It should be also noted that the method and apparatus involve much complexity in implementation since they include an objectionable multiplicity of operations and auxiliary devices. To such operations and auxiliary devices belong powder separation and powder separating cyclone, powder heating and powder heater, powder conveyance and powder conveying means, all of these operations being carried out at different stages, which makes the process unnecessarily protracted.

The above-described method and apparatus are also characterized by that heating of the dust by an additional heat-carrier flow brings about an increase in the consumption of fuel.

Known in the prior art is a method of producing a granulated material from suspension (see U.S.S.R. Inventor's Certificate No. 402726, Int. Cl. F 26 B 3/12, filed Aug. 16, 1971/, which comprises spray-drying the suspension, removing the dried material from a drying chamber and separating into fractions by multistage air sizing, injecting fine fractions of the dried material by a separate air flow to a hollow spray of the suspension.

An apparatus for practicing this method comprises a spray-type drier provided with a pneumatic nozzle for spraying material (suspension) being dried, a cyclone for separating dried material from waste gas, a multistage air sizer, a mixing chamber for mixing air with dust, a compressed air source, an ejecting nozzle for supplying dust to the hollow spray of suspension.

The above-described method and apparatus are characterized by that the procedure of segregating dried material into fractions is conducted in the form of a separate operation done in the self-contained structurally complex multistage sizer. Moreover, the supply of fine fractions of dried material to the hollow spray of suspension, i.e. to the spraying chamber, calls for a special device and compressed air energy. All this makes the method too complicated, adds to the duration of the process and results in the overly sophisticated design of the entire apparatus. It should be also noted that the foregoing method and apparatus exclude the possibility of effecting high-temperature thermal treatment of the granulated material, which makes them useful only for drying processes and thereby confines their application range.

Known in the prior art is a method of producing granulated materials comprising spraying a suspension by a rotating disc, drying the suspension, removing waste gas with a portion of the dried product, separating a portion of the dried product from the waste gas and supplying the aforesaid portion of the product to the rotating disc (see F.R.G. Pat. No. 2,201,111, Int. Cl. F 26 B 3/12, filed Jan. 11, 1972).

An apparatus for practicing this method comprises a drying chamber having a spraying rotating disc, means for supplying a suspension to the rotating disc, means for removing waste gas with a portion of the dried material, a cyclone for separating a dried product from the waste gas, said cyclone being mounted inside the drying chamber coaxially with the spraying rotating disc at a small distance therefrom, an exhaust pipe for removing waste gas connected to the cyclone and means for unloading a finished product from the lower portion of the drying chamber.

The abovedescribed method of and apparatus for producing granulated materials are characterized by that to the hollow spray created by the spraying rotating disc are supplied unsized fractions of the dried material, which at a subsequent stage excludes the possibility of obtaining a monofractional finished product. Furthermore, the dried product is passed to the rotating disc by the flow of waste gas, as this takes place, the particles of the product are not heated and, consequently, a decrease in the intensity of heat and mass transfer process occurs. It should be noted that the supply of the dried product to the rotating disc is accomplished solely by meuns of air rarefaction provided in the rotation of the disc. As a result, such a method and apparatus are operable only with disc spraying and hardly applicable with other methods of suspension spraying. What is more, the abovedescribed method and apparatus are complicated, while the provision of the cyclone inside the drying chamber reduces its capacity, which causes a decrease in the efficiency of the method and apparatus and makes the maintenance of the latter difficult.

The above method and apparatus are also characterized by that they do not afford the effectuation of high-temperature thermal treatment of the dried granulated material, which confines their application range.

Known in the prior art is a method of producing granulated materials from a suspension (see French Pat. No. 2,266,129, Int. Cl. F 27 B 15/00; B01j 6/00; C01 F 5/10, filed Oct. 24, 1975), which comprises spraying the suspension in a thermal treatment chamber, drying and thermally treating the same by the flow of a heat-carrier introduced to the chamber tangentially, withdrawing the thermally treated material from the chamber by means of an unloading device, a portion of the thermally treated material being withdrawn from the thermal treatment chamber together with the waste gas. This is followed by separating this portion from the flow of the waste gas in a separator arranged beyond the thermal treatment chamber and passing it to the zone located beneath the mounting zone of burners, or directly into the burners.

An apparatus for practicing the above method of producing granulated materials comprises a cylindrical thermal treatment chamber, suspension spraying means, burners mounted tangentially inside the lower portion of the chamber, a gas flue for withdrawing waste gas serving for the separation of material particles from the waste gas, a pipe line for returning this material to the zone located beneath the mounting zone of the burners or directly into the burners, and means for unloading thermally heated materials from the lower portion of the chamber.

However, the above-described method and apparatus do not enable to produce a thermally treated product having a homogeneous granulometric composition due to the absence of product granules sizing, which results in the polidisperse makeup of the finished material. Furthermore, the material separated from the waste gas is returned to the chamber, wherein it is also mixed with the remaining material subsequent to roasting. Consequently, this leads to an increase in the number of pulverulent fractions in the finished product, thereby increasing the polydisperse nature of the finished product. It should be also noted that the separation of the pulverulent fractions in an individual unit and the necessity of resupplying these fractions into the apparatus makes the method and design of the apparatus objectionally complicated. The prior art method and apparatus are also characterized by that they do not permit to effect treatment of the suspension with varying capacities (different from the rated capacity in 5 to 10 times) upon the retention of a constant specific fuel consumption rate. This is attributable to the fact that a decrease in the capacity and a reduction in the fuel consumption cause disturbances in the aerodynamic operating conditions of the apparatus (the amount of fuel decreases, while the dimensions of the apparatus remain unchanged). As a result, the application range of the method and apparatus is restricted.

Known in the prior art is a method of producing granulated materials from suspensions (see French Pat. No. 2080016, Int. Cl. P 26 B 5/00, filed 18, 1971) comprising spraying the suspension into the downcoming flow of a heat-carrier provided by tangentially mounted nozzles and drying it therein upon its moving downward in a direct current wth the heat-carrier, subsequently separating the dried material from the heat-carrier by means of creating another upcoming flow of air at the confluence area of the upcoming air flow and the downcoming heat-carrier flow, and unloading the material from the apparatus.

An apparatus for practicing the above method of producing granulated materials comprises a cylindrical drying chamber divided by a diaphragm into two compartments—the upper and lower one, means for spraying the suspension, means for introducing a heat-carrier and air mounted tangentially so as to form a downcoming heat-carrier flow in the upper portion of the chamber and an upcoming air flow in the lower one, and an unloading device mounted at the level of the location of the diaphragm.

The above-described method and apparatus are characterized by that the fine fractions of the material are mixed with the large ones at the unloading point. As a result, the dried material has a polydisperse composition. Furthermore, the method and apparatus are characterized by the complexity of carrying out the process of obtaining granulated materials as well as by the complexity of the apparatus design.

It should be also noted that the foregoing method and apparatus do not allow to produce granulated material with a varying capacity under a constant specific fuel consumption rate since the processing of the material according to such a method and in such an apparatus calls for the close observance of aerodynamic conditions which undergo disruption upon a decrease in the consumption of fuel. Consequently, the material processing with a small capacity brings about an increase in the specific consumption of fuel.

Known in the prior art is a method of an apparatus for producing granulated products from suspensions (see French Pat. No. 2,083,223. Int. Cl. F 26 B 3/00, filed Oct. 12, 1971, claims priority of July 7, 1970, Japanese Pat. No. 47 026, 1970), which is closely related in its technical essence to the subject of the present invention and therefore identified as prototypal.

The method under consideration comprises the steps of forming a bed of dried material solid particles at the bottom of a drying chamber defined by a vertical cylinder, blowing a heat-carrier into the foresaid bed through the lower portion thereof for the purpose of forming a "fluidized" bed of dried material solid particles, supplying the heat-carrier to the drying chamber in a downcoming vortex flow along the lateral walls of the drying chamber so as to provide a circulation of the dried material solid particles from the "fluidized" bed up to the axis of the drying chamber, spraying the suspension in the upper portion of the drying chamber during which the drops of the suspension collide with the fine particles of the dried material circulating from the "fluidized" bed with the formation of larger particles, drying these large particles in a direct current with the heat-carrier, withdrawing the largest particles of the dried material from the "fluidized" bed.

The "fluidized" bed of the solid particles of the dried material is interpreted in this case as the conversion of the bed of granular loose dried material to a pseudo-liquid under the effect of the flow of a fluidizing agent (i.e. heat-carrier) passing through the bed.

An apparatus for practicing the above-described method comprises a drying chamber designed in the form of a vertical cylinder provided with an opening for gas inlet in the upper portion of the drying chamber by means by which there is formed a spiral downcoming heat-carrier flow, suspension spraying means mounted inside the drying chamber, a perforated plate mounted in the lower portion of the chamber and means for blowing a heat-carrier through the perforated plate for the formation of a "fluidized" bed of dried material solid particles, an opening for waste gas outlet made in the upper portion of the drying chamber and means for withdrawing a finished product from the drying chamber.

The above-described method of and apparatus for producing granulated products are characterized by that in order to accomplish the process of granulation use is made of two heat-carrier flows, one of which is directed to the hollow spray of suspension, while the other to the "fluidized" bed of dried material solid particles. In this case the presence of the "fluidized" bed of dried material solid particles require precise proportioning of the amount of the suspension supplied and the amount of the material contained in the "fluidized" bed of solid particles inasmuch as upon an increase in the amount of the suspension dried the "fluidized" bed of solid particles may be supplied with the excessive amount of dried material, which will cause its conversion from the "fluidized" bed to the solid bed and its further blocking. On the other hand a decrease in the amount of the suspension dried leads either to an increase in the amount of the heat-carrier supplied to the "fluidized" bed of dried material solid particles, or to an increase in the dust ejection from the apparatus, which is also an undesirable phenomena.

It should be also noted that due to the above-mentioned reasons a certain ratio of the amounts of the heat-carrier supplied to the suspension spraying zone and to the "fluidized" bed of dried material solid particles is to be closely observed. As a consequence, apparatus aerodynamic and thermal conditions as well as control of these conditions are made more complex.

Furthermore, unloading of the finished product from the apparatus through the lower portion of the "fluidized" bed of dried material solid particles may result in the penetration of its fine particles into the finished product since an increase in the concentration of solid particles in the "fluidized" bed above the permissible may cause disruption of the "fluidized" bed with the penetration of dried material solid particles into the finished product. It should be also noted that upon moving in the "fluidized" bed dried material solid particles undergo abrasion, which leads to a lengthening of the granulation process and an increase in the dust ejection from the apparatus.

The above-described method and apparatus are also characterized by that the thermal treatment of the material by a high-temperature heat-carrier involves much difficulty since the heating of some materials and their dissociations may cause the formation of agglomerates (for example, in treatment of cement-raw granules), which leads to the clogging of the "fluidized" bed of dried material solid particles. And in case of the formation of a liquid phase on the surface of the granules of the thermally treated material the possibility of using the "fluidized" bed of solid particles is completely exluded due to the formation of large-size agglomerates. Thus, this prior art method and apparatus are characterized by that they do not allow to carry out thermal treatment of various materials and can be used only for suspension drying.

Furthermore, the method and apparatus under consideration do not enable to perform treatment of the suspension with varying capacities at a constant specific fuel consumption rate. The retention of the specific fuel consumption rate at a constant level presupposes that upon a 5 to 7-fold decrease in the amount of the suspension treated the total heat-carrier consumption should be also decreased just as much. In this case, however, a decrease in the amount of the heat-carrier supplied in a downcoming flow also the "fluidized" bed of dried material solid particles results in the disruption of aerodynamic operating conditions of the process and apparatus and, therefore, the treatment of the material becomes impossible.

It should be also noted that the prior art method envisages drying of the material in a direct current with the heat-carrier, which impairs the intensity of heat- and mass-transfer processes.

SUMMARY OF THE INVENTION

It is an object of the present invention to simplify the process of producing granulated products by means of the rational establishment of temperature and aerodynamic conditions.

Another object of the present invention is to step up the mono-fractionality of the granulated product.

Still another object of the present invention is to intensify the process of heat exchange of the material with the heat-carrier and to take fuller advantage of the heat of a high-temperature heat-carrier.

Still another object of the invention is to reduce the duration of the process of producing granules.

Still another object of the present invention is to ensure the possiblity of thermal treatment of the materials with various physico-chemical properties.

Still another object of the present invention is to ensure the possibility for using substandard material for producing a high-quality granulated product.

Still another object of the present invention is to reduce the dust content of waste gas.

Still another object of the present invention is to simplify the design of the apparatus for practicing this method.

Still another object of the present invention is to unify a device for drying of the material and thermal treatment of the products obtained in a single design.

Still another object of the present invention is to ensure the possibility for producing granulated materials with a varying capacity at a constant fuel consumption rate.

Still another object of the present invention is to reduce the production area occupied by the apparatus for practicing this method.

With these and other objects in view there is provided a method of producing granulated products from a suspension, comprising the steps of spraying the suspension in a suspension spraying zone, supplying a heat-carrier in the form of a spiral flow to provide suspension spraying, drying the suspension with the help of the aforesaid heat-carrier and simultaneously delivering fine fractions of the dried material to the spraying zone, withdrawing the heat-carrier spent after suspension drying, thermally treating granules produced by drying and withdrawing them from the thermal treatment zone, wherein, according to the invention, the step of drying the suspension is conducted in a direct current and in a counter current with the heat-carrier being introduced to a zone located beneath the suspension apraying zone, the same heat-carrier flow being employed for separating fine fractions from the dried material and for delivering them to the suspension spraying zone, as well as to heat the granules formed in the drying process and moving downward along spirals in a counter current with said heat-carrier flow up to a temperature ensuring the desired properties of a product.

With these and other objects in view, there is also provided an apparatus for producing granulated products from a suspension, comprising a chamber, heat carrier introducing suspension spraying means mounted inside the chamber, pipes provided in the body of the chamber for withdrawing waste gas and means for discharging a thermally treated product through the lower portion of the chamber, wherein, according to the invention, the chamber is designed with a cross-sectional area variable in height and accommodates in its upper portion having the largest dimensions the suspension spraying means, while the heat-cassier introducing means is mounted in the lower portion of the chamber and is arranged in spirals, the pitch and diameter of the spiral turns being designed variable along the height of the chamber and increasing toward the mounting site of the suspension spraying maans so as to provide in the chamber upcoming spiral flows of the heat-carrier.

Drying of the suspension in a direct current and in a counter current with the heat-carrier performed in the upper portion of the chamber having the largest dimensions ensures the most favourable drying conditions which preclude sticking of the particles to the chamber walls. In this process dried particles of the suspension are passed to the high temperature thermal treatment zone in the form of dry shaped granules.

Introducing of the heat-carrier to the zone of the chamber, located beneath the suspension spraying zone with the help of the heat-carrier introducing means mounted in the lower portion in spirals whose turn pitch and diameter are designed variable along the height of the chamber and increase toward the suspension spraying zone ensures the simultaneous accomplishment of a number of technical effects, that is, creates an upcoming spiral flow of the heat-carrier directed from top to bottom toward the suspension spraying zone; enables to carry out sizing of the dried material and to separate granules of the specified size from fine fractions using the same heat-carrier flow; allows to perform thermal treatment of the separated granules upon their moving downward along a spiral in a counter current with the aforesaid heat-carrier flow, this being done simultaneously with sizing; ensures the possibility of enlarging separated fine particles by means of supplying them to the suspension spraying zone; permits to intensity the drying process by means of delivering the heated fine fractions of the dried product to the suspension spraying zone and to use these fine fractions as the centers for forming larger granules; reduces the duration of effecting the entire process as a whole since such an organization of the process enables to conduct all of the foregoing operations in a concurrent manner.

According to one of the embodiments of the method it is expedient that a portion of the heat-carrier be obtained by passing cold gas in the form of an upcoming spiral flow through the heated granules in a counter current with them.

Passing of cold gas in a counter current with the granules in an upcoming spiral flow affords the use of the gas heated by the granules due to heat transfer as a heat-carrier, which ensures savings in the fuel expended for the effectuation of the process.

According to another embodiment of the method it is expedient that a portion of the heat-carrier produced by means of passing cold gas through the heated granules be used as an oxidizer in combustion of the fuel expended for directing a heat-carrier flow to the zone located beneath the suspension spraying zone.

The possibility of using a portion of the heat-carrier as an oxidizer in combustion of the fuel allows to improve thermodynamic efficiency of the burning and leads to a decrease in the fuel consumption.

While practicing the method it is expedient that a temperature of the heat-carrier being introduced to the zone located beneath the suspension spraying zone in treating carbonate suspensions be selected in the range of 750° to 1750° C.

The selection of a temperature of the heat-carrier being introduced to the zone located beneath the suspension spraying zone in the range of 750° to 1750° C. enables to obtain products with different physicochemical and mechanical properties. For example, from one and the same chalk suspension there can be produced chalk fertilizers and lime. Thus, to produce unsoakable chalk fertilizers a minimum temperature of the heat carrier should amount to 750° C.

Furthermore, the lower temperature limit equal to 750° C. is the minimum value required for decarbonization of a cement-raw powder with a carbonization degree of 45.0%.

The heat-carrier temperature equal to 1,750° C. is the maximum value permissible in thermal treatment of a calcareous granulated material composed of 95 to 98% of calcium carbonate ($CaCO_3$) for the purpose of producing lime. An increase in the temperature above this limit results in the overburning of lime, which is impermissible.

It is also expedient that an initial heat-carrier flow rate be selected in the range of 50 to 150 m/sec.

The selection of a different initial heat-carrier flow rate in the range of 50 to 150 m/sec permits to change the twisting effectiveness of a spiral heat-carrier flow and the intensity of a centrifugal field in which the material is subjected to sizing. As a result, by changing the conditions of sizing it becomes possible to produce granules of different sizes. The lower limit of an initial rate in this case ensures the production of granules having a size of about 200 microns, while the upper limit yields granules with a size of about 800 microns.

According to one of the embodiments of the apparatus for practicing the above method for producing granulated products from a suspension it is expedient that a part of the heat-carrier introducing means be made as burner for creating the high temperature heat-carrier, while the other part of the means located beneath the above-mentioned burner be made as nozzles connected to the cold gas source.

Such an arrangement of the means allows to accomplish both high temperature heating of the granules of a product and their cooling as well, which enables further transportation and packaging of a product in a cold state. Furthermore, the heat obtained in this case from the granules upon their highly effective cooling return to the production process, which improves its economic efficiency.

According to still another embodiment of the apparatus implementing the above method of producing granulated products from a suspension, it is expedient that the lower portion of the chamber be provided with a horizontal joint and a portion of the chamber located thereunder be made movable and mounted on a platform for moving normally to the axis of the upper portion of the chamber, the platform be additionally provided with at least one movable portion of the chamber of another type size.

Such a design of the apparatus allows to obtain a granulated product from suspensions with a varying capacity, for example, with a rated one and with a capacity 5 to 10 times less than the rated one at a constant specific fuel consumption rate. At that, instead of two or more self-contained large-size apparatus, use is made of one apparatus, which reduces production areas, material consumption of the apparatus and ensures convenience in its maintenance. Whenever a charge in the capacity of the apparatus is desired, an easy and rapid alteration of the design of the latter provides discontinuity in the production process.

The foregoing and other objects as well advantageous features of the proposed invention will become more apparent from a consideration of the following detailed description of its embodiments given by way of example with reference being made to the accompanying drawings, wherein:

BRIEF DESCRIPTION OF THE ACCOMPANYING DRAWINGS

FIG. 3 shows one of the embodiments of an apparatus implementing the above method for producing granulated products, longitudinal section;

FIG. 4 is an enlarged sectional view of FIG. 3 through the line IV—IV;

FIG. 5 is an enlarged sectional view of FIG. 3 through the line V—V;

FIG. 6 is an enlarged side view of the unit A of FIG. 3;

DETAILED DESCRIPTION OF THE INVENTION

Figure 1:
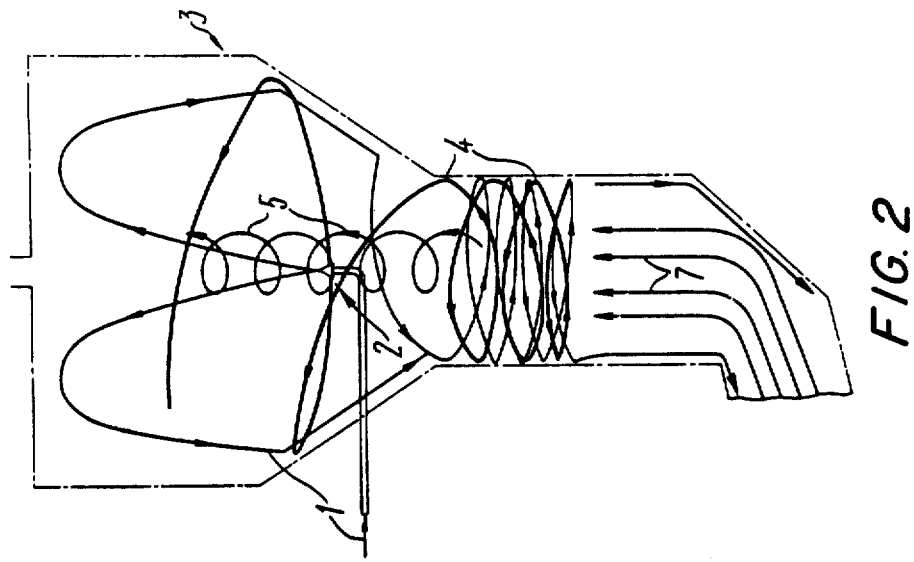
FIG. 1 shows a chart illustrating a method of producing granulated products from a suspension, according to the invention.

Referring now to FIG. 1, there is shown a chart illustrating a method of producing granulated products from a suspension. An initial suspension 1 is sprayed by suspension spraying means 2 (atomizers) in the upper portion of a chamber 3. In the lower portion of the chamber 3 there is created the upcoming spiral flow of a heat-carrier 4. The drops of the sprayed suspension 1 penetrate into the flow of the heat-carrier 4, move initially in a direct current therewith to the upper point of the drop flight path and become dried to particles with a moisture content of 8.0 to 12.0%. Then, while falling, the particles of the indicated moisture, content move in a counter current with the heat-carrier 4 and get dried to a moisture content of 0.1 to 3.0%. In this way complete drying of the granules and exclusion of the possibility of their adhesion to the walls of the chamber 3 are guaranteed. The dried material of a different granulometric composition under gravity pours down into the lower portion of the chamber 3, where large granules under the action of centrifugal forces arising due to the twisting of the flow of the heat-carrier 4 are thrown to the lateral walls of the chamber 3 and move downward near the walls of the chamber 3 along spirals in a counter current with the flow of the heat-carrier 4. These granules are heated in the flow of the heat-carrier 4 to a temperature ensuring the required properties of a product. Fine fractions 5 (particles) of the material isolated in the sizing process are entrained by the spiral flow of the heat-carrier 4 upward, heated in this flow and ejected thereby to the zone of spraying the suspension 1. In the zone of spraying the suspension 1 the drops of the sprayed suspension 1 merge with these fine particles 5 and form larger particles, which are subjected subsequently to drying, the heated fine particles 5 serving in this case as a hot filling of the centers, which conduces to the intensification of the drying process and permits to obtain large granules after drying.

The size of the granules isolated in sizing by the spiral flow of the heat carrier 4 is regulated within the range of 200 to 800 microns by varying an initial heat-carrier flow rate within the range of 50 to 150 m/sec.

The temperature of the heat-carrier 4 used for thermal treatment of the dried granules of carbonate suspensions is selected within the range of 750° to 1750° C. depending on the required properties of a finished product and its form. Thus, in order to produce chalk fertilizers it is chosen equal to 750° C., while for thermal treatment of lime granules it is chosen equal to 1750° C.

The granules which have gone through thermal treatment, in case they are not to be subjected to further thermal treatment are cooled. This is effected by countercurrently passing through the heated granules an upcoming spiral flow of low-temperature gas 6. This gas 6 is heated and can be used later either as a heat-carrier, i.e. enters the upper portion of the chamber 3 for drying the suspension 1 and thermal treatment of the dried particles, or as an oxidizer for fuel combustion. In the latter case the gas 6 is supplied to the zone located beneath the zone of spraying the suspension 1 and mixed with the fuel expended for drying and thermal treatment of the granules. This consequently ensures highly effective fuel combustion and leads to generation of an upcoming spiral flow of the heat-carrier 4. In this case a decrease in fuel consumption takes place thanks to an improved thermodynamic efficiency of the burning. A finished product in the form of cooled granules is fed for packing.

In case there is no need in the cooling process, the heated granules can be directly supplied for further thermal treatment, e.g. sintering or melting, required for the production of cement clinker and the like.

The invention will be further described with reference to the following illustrative examples.

EXAMPLE 1

Consider by way of an example the method of producing granulated lime from a chalk material contaminated with impurities and having a natural moisture content of 23.0 to 25.0%. In nature such a raw material represents a pasty mass containing up to 13.0–15.0% of large-sized (5–500 mm) inclusions of silica ($SiO_2$), whereby the treatment of the chalk having such a moisture content presents a severe problem, while the lime produced by such treatment features a low activity. For the above-mentioned reason the chalk is moistured and converted to a suspension having a moisture content of 40.0%. The suspension is then cleaned, e.g. in vibration cleaners, to withdraw the extraneous inclusions. The chemical composition of the dry fraction of the suspension is as follows, mass %: $CaCO_3$, 95.0; $SiO_2$, 2.4; $Al_2O_3$, 1.5; $MgCO_3$, 0.6; $Fe_2O_3$, 0.5. To produce 1 kg of lime with a chemical activity of 90.0% it takes 2.91 kg of the chalk suspension. The chalk suspension 1 (FIG. 1) having a moisture content of 40.0% and cleansed from extraneous impurities more than 3 mm in size is fed at a pressure of 2.5–3.0 MPa to the suspension spraying means 2 (atomizers) wherein the chalk suspension 1 is dispersed in drops of 20 to 800 microns in size. A fuel-air mixture (fuel gas and primary air) is supplied to the lower portion of the chamber 3 at an initial rate of 7.6 to 9.0 m/sec. The amount of the primary air is 10.0 to 20.0% of the total amount of air required for combustion of the fuel gas, the air-to-fuel ratio $\alpha$ being within 1.1–1.3. The remaining part of the air constituting 90.0–80.0% of the total amount of air is fed in the form of a spiral upcoming flow from the lower zone for mixing with the flow made up of the fuel gas and primary air. The gas burns in the obtained mixture, thus forming a spiral upcoming flow of heat-carrier 4 with a temperature of 1,600°–1,750° C. and with an initial rate of 50.0 m/sec.

The drops of the dispersed suspension 1 are dried in the flow of the gaseous heat-carrier 4 moving concurrently and then countercurrently therewith to form granules with a moisture content of 0.1 to 3.0 % and with a size of 15 to 300 microns. In so doing, the temperature in the drying zone is established within the following limits: at the inlet of the drying zone, 700° to 900° C.; in the middle portion of said zone, 200° to 250° C.; at the outlet of the drying zone, 120° to 150° C.

The dried particles are entrained into the spiral upcoming flow of the heat-carrier 4. In the upcoming flow of the high-temperature heat-carrier 4 the particles 5 having a size below 200 microns are separated from the total flow of the material and are ejected thereby to the suspension spraying zone. When moving to the spraying zone, the particles 5 are subjected to heating and merge with the drops of the sprayed suspension 1, which results in forming larger granules and in increasing of the homogeneous granulometric composition of the dried material. Said heated particles 5 serve in this case as a hot filling of the centers, which conduces to the intensification of the drying process and permits to obtain larger granules. The granules of the size over 200 microns separated from the dried material under the action of centrifugal forces are thrown to the lateral walls of the chamber 3 and move downward along spirals in a counter current with the flow of the heat-carrier 4. At the same time granules are heated due to the heat exchange effect to a temperature of 950° to 1000° C., whereby carbonate fraction of the lime granules undergoes dissociation. The reaction of lime dissociation is endothermic, the released thermal energy being 1660 kilojoules/kg, whereby the temperature in the zone of heat treatment is established within the range of from 1000° to 1100° C. When leaving the heat-carrier flow the granules of calcium carbonate (CaCO$_3$) are essentially completely converted to lime (CaO) with a degree of dissociation equal to 95.0–99.0%. The heated lime granules with a size of from 200 to 300 microns are entrained by the upcoming spiral flow of cold gas 6 (secondary air) and due to heat exchange are cooled down to 50°–100° C., the secondary air heating therewith to a temperature of 300°–400° C. Then the heated gas 6 (secondary air) upwardly moving along the spiral is mixed with the fuel gas and with the primary air, thus forming the spiral flow of the heat-carrier 4, whereas the cooled lime granules which are essentially a finished product pass for packing. Heat transfer from the heated lime granules to the flow of gas 6 improves the economic efficiency of the production process, since heat losses generally arising from transportation of the heated product to a cooler and recirculation of the heat to the production process are eliminated.

As an alternative to the fuel gas, natural fuel gas, black oil, or solid fuel can also be suitably used. In this case it is only necessary to change the design of the burners for the high-temperature heat-carrier 4. The expenditure of heat, in this case, will be from 6,200 to 6,700 kilojoules per 1 kg of lime.

The resulting cooled lime is a fine-granulated nonpulverable product with a particle size of 200 to 300 microns, with a chemical activity of 90.0% and with a lime slaking time of 6.5 minutes.

EXAMPLE 2

Consider by way of another example the method of producing granulated lime from a chalk material contaminated with impurities, the moisture content, the chemical composition, as well as the treatment conditions of the suspension are similar to those described in Example 1 except for an initial rate of the fuel-air mixture feed equal in this case to 9.0–15.5 m/sec. Under these treatment conditions an initial rate of the heat-carrier 4 equals to 60–100 m/sec.

The resulting product is a granulated lime with a particle size of 300–450 microns.

EXAMPLE 3

Consider by way of still another example the method of producing granulated lime from a chalk material contaminated with impurities, the moisture content, the chemical composition and the treatment conditions of the suspension are similar to those described in Example 1 except for an initial rate of the fuel-air mixture feed equal in this case to 15.0–22.0 m/sec. Under these treatment conditions an initial rate of the heat-carrier 4 equals to 100–150 m/sec.

The resulting product is a granulated lime with a particle size of 450–800 microns.

EXAMPLE 4

Consider by way of still another example the method of producing granulated lime from a chalk suspension.

The chemical composition of the starting material, the suspension spraying conditions, as well as aerodynamics treatment conditions are similar to those given in Example 1.

To produce granulated lime with a size particle of 450–550 microns, the fuel-air mixture is supplied to the lower portion of the chamber 3 at an initial rate of 15.0–16.5 m/sec. The amount of the primary air supplied together with the fuel is 15.0–25.0% of the total amount of air required for combustion of the fuel, the air-to-fuel ratio $\alpha$ being within 1.1–1.3. The remaining part of the air (secondary air) constituting 85.0–75.0% of the total amount of air is fed in the form of an upcoming spiral flow having an initial rate of 90–100 m/sec. This air flow (gas 6) (FIG. 1) passes through the granules of the dried material, is heated up to a temperature of 350° to 450° C. and is mixed with the flow of the fuel-air mixture. The fuel burns forming an upcoming spiral flow of the heat-carrier 4 having a temperature of 1,600° to 1,750° C. and an initial rate of 90 to 100 m/sec. The granules of the dried material entrained by the flow of the heat-carrier 4 are subjected to sizing. The granules less than 480–500 microns form a flow of particles 5 and move toward the hollow spray of the suspension 1, while large granules under the action of centrifugal forces are thrown to the lateral walls of the chamber 3 and move downward along spirals in a counter current with the flow of the heat-carrier 4. In the same time, said granules are heated up to a temperature of 950° to 1,000° C., whereby carbonate fraction of the lime granules undergoes dissociation yielding lime and carbon dioxide. The reaction of dissociation is accompanied with heat absorption, whereby in the lower portion of the chamber 3 a temperature of 1,000°–1,100° C. is attained. The production process is further effected in a way similar to that described in Example 1.

The resulting lime is a granulated product with a particle size of 450–550 microns, chemical activity of 90%, and lime slaking time of 7–7.5 minutes.

EXAMPLE 5

Consider by way of still another example the method of producing granulated lime from sugar production filtration sediment. The filtration sediment is a waste material obtained from lime milk used for saccharine juice purification and represents a suspension with a moisture content of 40.0–5.0%. The chemical composition of the suspension dry matter is as follows, mass%: $CaCO_3$, 90.4; organic admixtures, 4.2; mineral admixtures, 5.4.

With allowance made for irrevocable powder ejection (2.0%), 1.86 kg of filtration sediment as converted on a dry matter are required to produce 1 kg of lime with a chemical activity of 85.0%. The starting suspension 1 (FIG. 1) (filtration sediment) is sprayed under a pressure of 2.5–3.0 MPa by the spraying means 2 in the chamber 3. The production process is further effected in a way similar to that described in Example 1.

The resulting granulated lime comprises a 85.6% of active calcium oxide. The lime slaking time is 7.5–8.0 minutes. Upon slaking no unslaked grains are observed.

EXAMPLE 6

Figure 2:
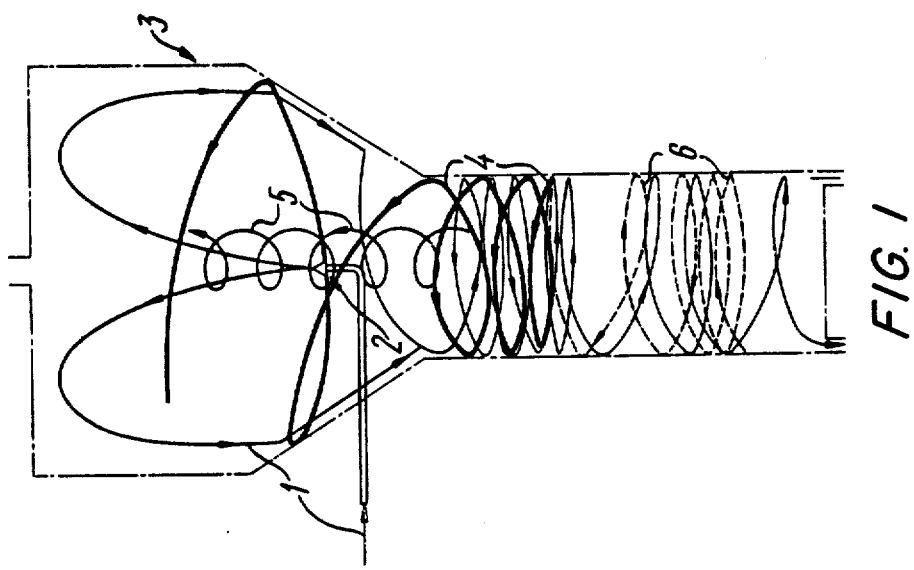
FIG. 2 shows a chart illustrating a method of producing a granulated product, namely a decarbonized cement powder from a cement—raw suspension, according to the invention.

Consider by way of yet another example the method of producing decarbonized cement powder from a cement-raw suspension with a moisture content of 40.0%. The chemical composition of the raw suspension dry matter is as follows, mass %: $SiO_2$, 13.5; $Al_2O_3$, 3.6; $Fe_2O_3$, 3.5; CaO, 43.1; MgO, 0.6; $SO_3$, 0.5; $K_2O$, 0.4; $Na_2O$, 0.4; losses on calcination, 34.4. The flow chart of the process is shown in FIG. 2. The cement-raw suspension 1 is fed under pressure of 0.8–2.5 MPa to the spraying means 2 and is sprayed in the chamber 3 into drops having a size of 20 to 850 microns.

Hot gases resulting from combustion of the fuel-air mixture, the air-to-fuel ratio $\alpha$ being within 1.1–1.3, is fed to the lower portion of the chamber 3 in the form of a vortex flow at a rate of 120 to 150 m/sec. The temperature of these gases ranges from 1,400° to 1,750° C. Natural fuel gas or black oil can be suitably used as a fuel. From the zone disposed beneath the zone of introduction of the vortex flow of said hot gases to the lower portion of the chamber 3 are also supplied gases 7 which are combustion products of the fuel, having a temperature of 1,100°–1,300° C. and an initial rate of 4.0–6.0 m/sec.

The drops of the dispersed suspension are dried in the upper portion of the chamber 3 in the flow of gaseous heat-carrier 4 moving concurrently therewith to form granules with a size of 15–750 microns. In so doing, the temperature in the drying zone is established at a level of between 150° and 240° C. The temperature of the spent gases discharged from the chamber 3 is from 140° to 160° C. The dried granules having a moisture content of 0.5 to 1.2% pour down under gravity into the lower portion of the chamber 3 and are entrained by an upcoming spiral flow of the heat-carrier 4, arising from the combustion of the fuel-air mixture, and by an axial flow of the heat-carrier 7 which is sucked into the underpressure zone formed in the chamber 3 due to the twisting of the flow of the heat-carrier 4.

The heat-carrier 4 directed to the drying zone has a temperature of 750° to 900° C. In the spiral flow of the heat-carrier 4 under the action of centrifugal forces granules over 450 microns are separated from the dried material. These granules are thrown to the lateral walls of the lower portion of the chamber 3 and move downward along spirals in a counter current with the flow of the heat-carrier 4. The granules having a size less than 450 microns are entrained by the heat-carrier 4 and together with the latter are directed in the form of a flow of small particles 5 to the hollow spray of the suspension 1. When moving in the flow of the small particles 5, the granules are heated up to a temperature of 450° to 650° C. and arrive at said hollow spray already heated. The drops of the sprayed suspension merge with these granules and form large particles. In doing so, the heated small particles 5 transfer their heat to the suspension drops merged therewith, thus intensifying the drying process. This leads to an enlargement of the granules and contributes to homogeneity of the dried material granulometric composition.

The granules over 450 microns while moving along spirals in a counter current with the flow of the heat-carrier 4 are heated therein up to a temperature of 950° to 1,000° C. At this temperature an intensive reaction of decarbonization of carbonate fraction of the granules takes place, accompanied by evolving of carbon dioxide.

The reaction being endothermic, the temperature in the heat treatment zone is established equal to 1,000°–1110° C. As the granules move further downward, the reaction of primary clinkering begins. As a result, the granules are decarbonized with a degree of decarbonization of 0.97 to 0.99. Decarbonized cement powder with a particle size of about 450–600 microns leaves the zone of the spiral flow of the heat-carrier 4 and, moving in a counter current with the flow of gas 7, is fed for clinkering which proceeds at a temperature of 1,350° to 1,450° C. In this case the total heat comsumption required for producing 1 kg of cement clinker from the suspension with a moisture content of 40.0% is 6,100–6,200 kilojoules. The amount of fuel consumed to provide the spiral flow of the heat-carrier 4 used for decarbonization of the cement-raw powder depends upon a desired degree of decarbonization. With the degree of decarbonization varying within 0.75–0.99, the amount of fuel supplied to the lower portion of the chamber 3 varies accordingly and accounts for 56.8 to 73.6% of the total fuel consumption required for heat treatment and clinkering.

Preliminary decarbonization of the cement-raw powder enables the rate of process to be increased 2.5–3.0 times. At the same time, the length of the kiln wherein clinkering of the decarbonized cement powder takes place can be reduced 2–2.8 times.

EXAMPLE 7

Consider by way of still another example the method of producing granulated chalk fertilizers from a chalk suspension.

The chemical composition of the starting material, the suspension spraying conditions, as well as the aerodynamics treatment conditions are similar to those given in Example 1 except for the temperature of the upcoming spiral flow of the heat-carrier 4 (FIG. 1) which, in this case, equals to 750°–800° C. The granules formed during the drying process, when moving along spirals in a counter current with the heat-carrier 4, are heated up to a temperature of 650° to 700° C., whereby strengthening of the granules surface layer occurrs.

The resulting product is a granulated chalk with a particle size of 200 to 300 microns, non-swelling in water for a long time (3–4 months). The experiments have revealed that the product can be successfully used as a fertilizer for acid soils. Storing and handling of the product are simplified. The fertilizer thus obtained is nonpulverable.

EXAMPLE 8

Consider by way of still another example the method of producing fine-granulated ceramic products from a clay with a natural moisture content of 18.0–25.0%. The moistured clay is cleaned to withdraw extraneous inclusions. The chemical composition of the dry matter of the cleansed suspension is as follows, mass%: $SiO_2$, 57.68; $Al_2O_3$, 11.13; $TiO_2$, 0.52; $Fe_2O_3$, 4.29; CaO, 8.02; MgO, 2.90; $Ka_2O$ and $Na_2O$, 4,59; $SO_3$, 0.17; losses on calcination, 10.70.

The clay suspension having a moisture content of 40.0% and cleansed from extraneous inclusions more than 1 mm in size is fed at a pressure of 2.5–3.0 MPa to the suspension spraying means 2 (atomizers) wherein the clay suspension is dispersed in drops of 10 to 800 microns in size. A fuel-air mixture (fuel gas and primary air) is supplied to the lower portion of the chamber 3 at an initial rate of 15–20 m/sec. The amount of the primary air is 10.0 to 20.0% of the total amount of air required for combustion of the fuel gas, the air-to-fuel ratio $\alpha$ being within 1.1–1.3. The remaining part of the air constituting 9.0–80.0% of the total amount of air required for fuel combustion is fed in the form of an upcoming spiral flow from the lower zone and is mixed with the fuel-air mixture. The gas burns, thus forming an upcoming spiral flow of a heat-carrier 4 having an initial rate of 80 to 90 m/sec and a temperature of 1,100° to 1,250° C. The clay suspension 1 is dried in the flow of the gaseous heat-carrier 4 with a temperature of 1,110° to 1,250° C. The drops of the clay suspension 1 are dried in the flow of the gaseous heat-carrier 4 moving concurrently and then countercurrently therewith to form granules with a moisture content of 0.1–5.0% and with a size of 10 to 400 microns. In so doing, the temperature of the gases in the drying zone is established within the following limits: at the inlet of the drying zone, 600°–850° C.; in the middle portion of said zone, 160°–250° C.; at the outlet of the drying zone, 100°–120° C.

The dried particles are entrained into the upcoming spiral flow of the heat-carrier 4 wherein the particles 5 having a size below 200 microns are separated from the total flow of the material and are ejected thereby to the suspension spraying zone. When moving in the spraying zone, the particles 5 are subjected to heating in the flow of the heat-carrier 4 and merge with the drops of the sprayed suspension 1, which results in forming larger granules. Said heated particles 5 serve in this case as a hot fillig of the centers, thus intensifying the drying process. The granules of a size over 200 microns separated from the dried material under the action of centrifugal forces developed by the upcoming spiral flow of the heat-carrier 4 are thrown to the lateral walls of the lower portion of the chamber 3 and move downward along spirals. At the same time, the granules are heated due to the heat exchange up to a temperature of 970° to 1,100° C. at which chemically bonded water is drawn off from the clay and the granules are strengthened due to liquid phase formation. The reaction of chemically bonded water removal is endothermic, the released thermal energy being 6,700 kilojoules per 1 kg of water. When leaving the heat-carrier flow, the ceramic granules are essentially completely free of chemically bonded water. The heated ceramic granules with a size of 200 to 400 microns are entrained into the upcoming spiral flow of cold gas (secondary air), and due to heat exchange are cooled down to 80°–100° C., the secondary air heating therewith to a temperature of 360°–520° C. When moving upward along spirals, the heated secondary air is mixed with the fuel-air mixture, thus forming a spiral flow of the heat-carrier 4.

The cooled ceramic granules are finely granulated nonpulverable product with a compression strength of 60–80 kg/cm$^2$, with a bulk mass of 800–950 kg/m$^3$. The product can be suitably used as an aggregate when manufacturing lightweight silica bricks and lightweight concrete. The total heat consumption ranges from 2,900 to 3,800 kilojoules per 1 kg of ceramic aggregate.

The apparatus implementing the herein-proposed method of producing granulated products from a suspension comprises a chamber 3 (FIG. 3) divided into compartments 8,9,10 and 11. Mounted within the compartment 8, i.e. in the upper portion of the chamber 3, having the largest dimensions, are suspension spraying means 2 (centrifugal atomizers) communicated with a suspension supply pipeline 12. Means 13 for introducing a high-temperature heat-carrier (burners) are arranged along a spiral line in the compartment 9 located beneath the compartment 8, the axis of each burner 13 (FIGS. 4 and 5) being tangent to the spiral line. It should be noted that the pitch and diameter of the spiral turns increase along the height of the compartment 9 (FIGS. 4,5 and 6) towards the compartment 8 (FIG. 3) of the chamber 3.

The compartments 8 and 9 of the chamber 3 are interconnected by a taper connecting element 14. To provide more rational distribution of the heat-carrier within the compartment 8, arranged therein is a distributing means 15 directing hot gases supplied from the compartment 9 to a hollow spray. Pipes 16 and 17 are provided in the compartment 8 for waste gas discharge, located respectively at a point of conjugation of the compartment 8 with the connecting element 14 and in the vicinity to the upper end face of the compartment 8. The amount of gas fed through the pipes 16 and 17 into a common gas-duct 18 is controlled by means of a flap 19. The compartment 10 of the chamber 3 is disposed beneath the compartment 9 and is connected thereto by a taper connecting element 20 and cylindrical connecting element 21. The compartment 11 of the chamber 3 is disposed beneath the compartment 10 and is connected thereto by a taper connecting element 22 and cylindrical connecting element 23. Discharge means 26 are provided beneath the compartment 11 connected thereto by a taper connecting element 24 and cylindrical connecting element 25. The means 26 serve for discharging heat-treated products through the lower portion of the chamber 3.

Figure 7:
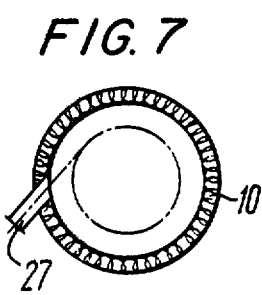
FIG. 7 is an enlarged sectional view of FIG. 3 through the line VII—VII.
Figure 8:
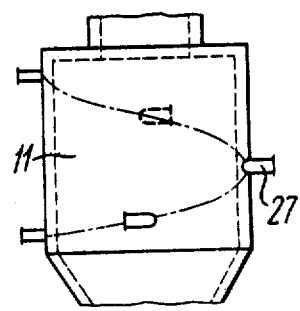
FIG. 8 is an enlarged side view of the unit B of FIG. 3.

On the lateral inner surface of the compartments 10 and 11 there are mounted cold gas introducing means 27 (nozzles) (FIGS. 3, 7, 8) arranged along a spiral line, the pitch and diameter of the spiral turns increasing along the height towards the compartment 9. The means 27 are communicated with a source (hot shown) of the cold gas 6. Alike nozzles (not shown) can be mounted within the cylindrical connecting elements 21 (FIG. 3), 23, 25 and within the taper connecting elements 22 and 24.

To prevent particles of the granulated product from penetrating into the waste gases and to provide optimal aerodynamics conditions, gas distributing means 28 are mounted within the compartment 8 of the chamber 3.

To meet varying requirements imposed upon the properties of the granulated product, the proposed apparatus can be insignificantly modified. For example, FIG. 3 shows the apparatus for producing granulated products requiring cooling at a final stage, such as lime produced from lime slurries.

Figure 10:
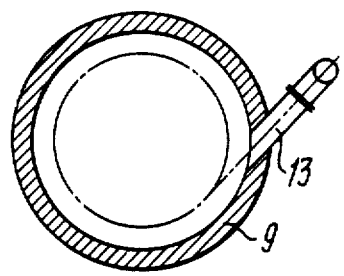
FIG. 10 is an enlarged sectional view of FIG. 9 through the line X—X.
Figure 11:
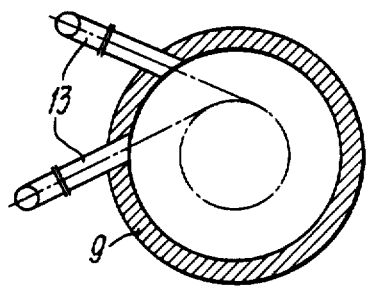
FIG. 11 is an enlarged sectional view of FIG. 9 through the line XI—XI.
Figure 9:
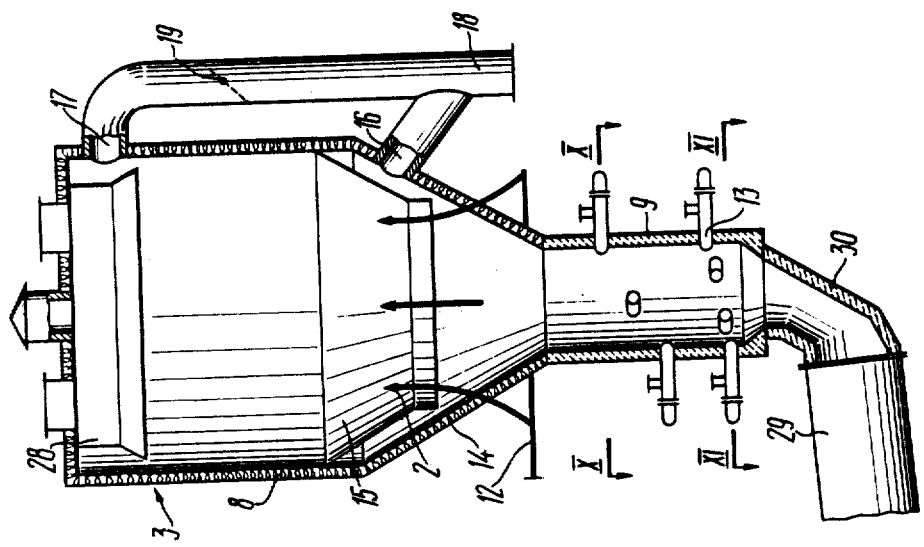
FIG. 9 shows an embodiment of an apparatus implementing the above method of producing granulated products from a suspension (decarbonized cement powder), longitudinal section.

In FIG. 9 there is shown an apparatus for producing granulated decarbonized cement powder from cement-raw suspensions. In this case, the apparatus is installed ahead of a rotary kiln 29 so as to provide feeding of the granulated decarbonized cement powder into the kiln 29 without cooling. Such such a flow chart, the rotary kiln 29 is used only for clinkering, while heating and decarbonization are carried out in the compartments 8 and 9 of the chamber 3. As a result, the efficiency of a conventional rotary kiln can be increased 2.5-3 times. The burners 13 are arranged within the compartment 9 of the chamber 3 along a spiral line, the axis of each burner 13 being tangent to the spiral line. The pitch and diameter of the spiral turns increase along the height of the compartment 9 (FIGS. 9, 10, 11) towards its conjugation with the taped connecting element 14 (FIG. 9) of the compartment 8. The compartment 9 is communicated with the rotary kiln 29 through a connecting element 30.

Figure 12:
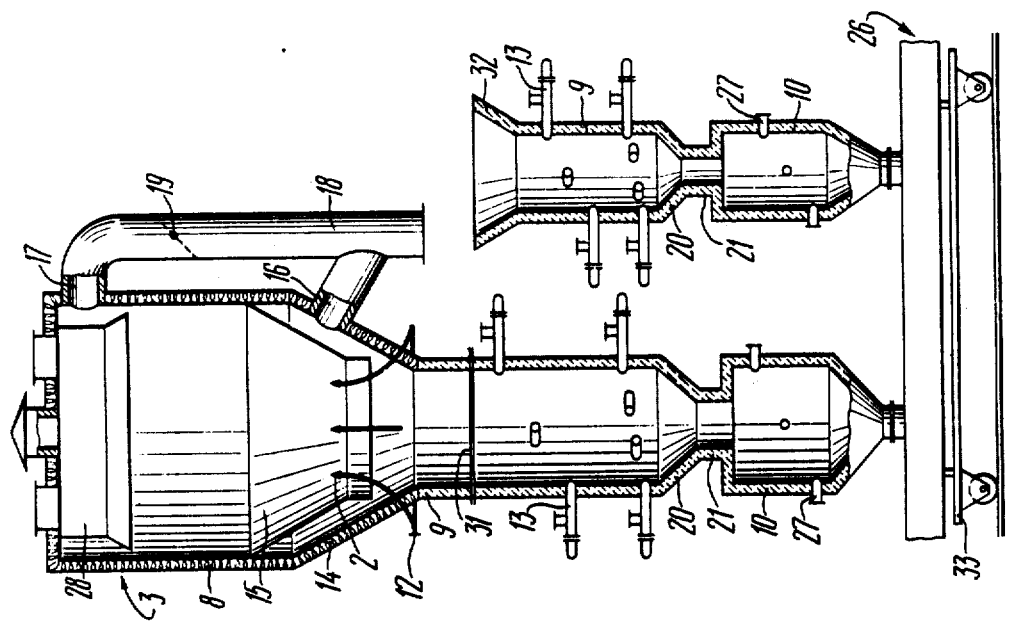
FIG. 12 shows an embodiment of an apparatus implementing the above method of producing granulated products from a suspension, incorporating a horizontal joint and the lower portion of a chamber of two type sizes, a longitudinal section, according to the invention.

In order to produce granulated materials with a varying capacity under a constant specific fuel consumption rate, an apparatus shown in FIG. 12 can be used.

The apparatus comprises the chamber 3 divided into the compartments 8,9,10 interconnected by the taper connecting elements 14 and 20 and by the cylindrical connecting element 21. The compartment 8 of the chamber 3 accommodates the centrifugal atomizer 2 connected to the suspension supply pipeline 12. The chamber 3 has a horizontal joint 31 to which the compartments 9 and 10 of different type sizes and the discharge means 26 mounted on a platform 33 can be coupled by means of a taper connecting element 32. The lower (movable) portion of the chamber 3, of another type size, mounted on the platform 33 is designed similarly to that shown in FIG. 3. The compartments 9 and 10 can move together with the platform 33 normally to the axis of the upper portion of the chamber 3. This ensures fast replacement of the compartments 9 and 10 at the joint 31 of the chamber 3.

The discharge means 26 can be made common to various type sizes of the movable elements of the chamber 3.

OPERATION

In operation, the suspension 1 (FIG. 1), such as carbonate suspension, is fed under pressure along the pipeline 12 (FIG. 3) to the centrifugal atomizers 2 and is dispersed into drops in the compartment 8 of the chamber 3. A fuel-air mixture is introduced into the compartment 9 passing through the burners 13 arranged along the spiral line. Gas 6 (air) is supplied into the compartments 9 and 10 of the chamber 3 through the nozzles 27 and is mixed with the fuel-air mixture. Owing to the spiral arrangement of the nozzles 27 in the compartments 10 and 11 there is created an intensive upcoming spiral flow of the gas 6 (air) which is mixed with the fuel-air mixture supplied through the burners 13 and ensures the fuel combustion.

The resulting heat-carrier 4 arrives in the form of a spiral flow at the compartment 8 of the chamber 3. The drops of the suspension 1 are dried in the flow of the heat-carrier 4 which is directed by the distributing means 15 to the hollow spray generated in the course of spraying of the suspension 1 by the atomizers 2. The dried particles drop on the taper surface of the connecting element 14 and pour into the compartment 9 of the chamber 3. There they are entrained into the upcoming spiral flow of the heat-carrier 4. Under the action of centrifugal forces developed by the flow of the heat-carrier 4, large granules are thrown to the lateral walls of the compartment 9, while the granules of a less size are drawn into the heat-carrier flow and are ejected thereby to the hollow spray of the suspension 1. When moving downward along spirals in a counter current with the heat-carrier 4, the large granules are heated. The small granules moving upward in the flow of the heat-carrier 4 are heated and merge with the drops of the sprayed suspension 1 transferring their heat to said drops. This leads to an intensification of the drying process and to an enlargement of the granulometric composition of the dried material. The large granules moving downward along spirals pass through the compartment 9 where they are subjected to a high-temperature treatment. It should be noted that the size of granules separated from the dried product can be set within the limits of 200–800 microns by altering an initial rate of the fuel-air mixture feed from the burners 13, and hence an initial rate of the heat-carrier 4. By altering the temperature of the gases generated during fuel combustion, heat-treatment conditions can also be changed, whereby different properties can be imparted to the resulting granulated product.

The heated granules are fed from the compartment 9 to the compartment 10 where they are cooled by the flow of gas 6 (air) supplied through the nozzles 27. The final cooling of the granules occurs in the compartment 11 of the chamber 3. From the lower portion of said compartment the granulated product arrives at the discharged means 26 through the cylindrical connecting element 25.

The waste gases can be removed from the compartment 8 through the pipes 16, 17 communicating with the lower and upper portions of said compartment, respectively. The pipe is chosen according to a minimum temperature of the waste gases and depends upon specific aerodynamics conditions in the apparatus. The flow rate of the waste gases in the gas-duct 18 supplied thereto from the pipes 16 and 17 is controlled by the flap 19.

In case there is no need in cooling the granules, e.g. in thermal treating of the cement-raw suspension, the thermally treated granules are fed without cooling through the connecting element 30 (FIG. 9) into the rotary kiln 29 or into another suitable set for further treatment of the granulated product.

The thermal treatment of the suspension with a varying capacity, e.g. with a capacity 5–10 times less than a rated one, is carried out in the apparatus shown in FIG. 12. In case of the rated capacity the thermal treatment of the suspension is performed in the compartments 8,9,10 of the chamber 3. The compartment 8 is used for suspension drying, the compartment 9, for sizing and thermally treating the suspension, and the compartment 10, for cooling the resulting granulated product.

As the need arises to change the apparatus capacity, the platform 33 is displaced to the left, whereby the compartment 9 of another type size is positioned under the joint 31. The taper connecting element 32 enters the joint 31, thus bringing the compartment 9 of another type size into communication with the compartment 8 of the chamber 3. Owing to the fact that upon decreasing the amount of the treated suspension the fuel consumption also decreases, the aerodynamics conditions in the compartments 9 and 10 of the chamber 3 remain unaltered, as well as sizing and thermal treatment conditions. As a result, a specific fuel consumption rate remains constant, which is of particular importance in case it is necessary to maintain constant the chemical composition of the gaseous phase, for example the content of carbon dioxide in the waste gases.

The cooled granulated material is discharged from the apparatus through the discharge means 26 which is common to the chamber lower portions of various type sizes, which provides for continuous processing cycle. Thus, the provision of the chamber 3 made up of two separate parts, the lower part being replaceable, enables fast changing in the apparatus design when it is necessary to vary its capacity, while maintaining its specific fuel consumption rate constant.

The proposed method of and apparatus for producing granulated products from a suspension allow to produce a high-quality granulated product from a standard, as well as from a substandard raw material. The present invention provides for concentration of the whole production process in a single apparatus. This facilitates the process controlling and allows to completely automate it. The process conditions are easily yielded to adjustment according to the desired properties of the finished product, saving in fuel and productive area being simultaneously achieved.

Though the above embodiments of the invention illustrated the processes of producing granulated lime from a chalk suspension, from a filtration sediment of sugar production, decarbonized cement powder from a cement-raw suspension, chalk fertilizers from a chalk suspension, ceramic fine-granulated product from a clay suspension, the proposed invention can be also successfully used in a large number of other processes of producing granulated products from various kinds of suspensions.

Although the present invention has been described herein with reference to the preferred typical embodiments thereof, it will be apparent to those skilled in the art that there may be minor modifications made in the proposed method and apparatus without departing from the spirit and scope of the invention. All such modifications and variations are contemplated to be embraced in the spirit and scope of the invention, as defined in the appended claims.

What is claimed is:

1. A method of producing granulated products from a suspension, comprising spraying a suspension in a suspension spraying zone, introducing a heat-carrier in the form of a spiral flow into a thermal treatment zone beneath the suspension spraying zone, drying the suspension by flowing the suspension concurrently relative to the heat-carrier and then countercurrently relative to the heat-carrier, simultaneously separating a fine fraction of the dried suspension by the heat-carrier flow and feeding the fine fraction to the suspension spraying zone, withdrawing spent heat-carrier after drying of the suspension, thermally treating suspension granules produced in the course of drying the suspension by flowing them in a spiral path counter-current to the heat-carrier in the thermal treatment zone up to a temperature sufficient to ensure the desired product properties, and withdrawing the thermally treated granules from the thermal treatment zone.

2. The method of claim 1, in which a portion of the heat carrier is obtained by passing cold gas along a spiral path counter-current to the thermally treated granules.

3. The method of claim 2, in which the portion of the heat carrier formed by passing the cold gas through the thermally treated granules is used as an oxidizer for combustion of fuel and the fuel is used to heat the heat carrier introduced into the thermal treatment zone.

4. The method of claim 1, in which the temperature of the heat carrier introduced into the thermal treatment zone is 750° to 1750° C.

5. The method of claim 1, in which the initial heat-carrier flow rate is 50 to 150 m/sec.

6. An apparatus for producing granulated products from a suspension, comprising a chamber having a cross-sectional area which varies along its height with an upper portion thereof having the largest dimension, a suspension spraying means mounted within the chamber in the upper portion thereof having the largest dimension, heat-carrier introducing means mounted in the lower portion of the chamber and arranged to introduce heat-carrier into the chamber along a spiral flow path, the pitch and diameter of spiral turns of the spiral flow path varying along the height of the chamber and increasing towards a mounting point of the suspension spraying means to provide an upward spiral flow of the heat-carrier, pipes provided in the chamber to withdraw waste gas, and means for discharging a thermally treated product from the lower portion of the chamber.

7. The apparatus of claim 6, in which a portion of the heat-carrier introducing means comprises burners for creating high temperature heat-carrier while another portion of the heat-carrier introducing means is located beneath the burners and comprises nozzles communicating with a cold gas source.

8. The apparatus of claim 6, in which the lower portion of the chamber has a horizontal joint and a portion of the chamber located under the joint is movable and is mounted on a platform for moving normal to the axis of the upper portion of the chamber, the platform being provided with at least one movable portion of the chamber of a different size.

* * * * *